United States Patent [19]

Schladitz

[11] 4,046,302

[45] Sept. 6, 1977

[54] METHODS OF MANUFACTURING BODIES OF CONGLOMERATED PARTICLES

[76] Inventor: Hermann J. Schladitz, 74 Plaentschweg, Munich, Germany

[21] Appl. No.: 687,512

[22] Filed: May 18, 1976

[30] Foreign Application Priority Data

May 26, 1975 Germany .............................. 2523249

[51] Int. Cl.² ............................. B23P 3/22; B22F 1/02
[52] U.S. Cl. .................................... 228/121; 228/178; 228/198; 29/419 R; 51/295; 51/309 R
[58] Field of Search ................. 29/419, 420; 228/121, 228/178, 198; 51/295, 309

[56] References Cited

U.S. PATENT DOCUMENTS

| 3,310,387 | 3/1967 | Sump et al. ........................ 29/419 X |
| 3,650,715 | 3/1972 | Brushek et al. .................... 51/309 X |
| 3,770,492 | 11/1973 | Schladitz ........................... 29/419 X |
| 3,850,590 | 11/1974 | Chalkley et al. ................... 51/309 X |

Primary Examiner—Al Lawrence Smith
Assistant Examiner—K. J. Ramsey
Attorney, Agent, or Firm—Oblon, Fisher, Spivak, McClelland & Maier

[57] ABSTRACT

A method of manufacturing a body of conglomerated particles has a primary step of coating the particles with very fine polycrystalline metal whiskers, which are sintered in place. The coated particles are then mixed with other filaments, of slightly larger size, which form a matrix. This is made coherent by metallic bonding of the filaments together and to the embedded coated particles. The resultant porous body may be compressed to reduce the porosity.

15 Claims, No Drawings

METHODS OF MANUFACTURING BODIES OF CONGLOMERATED PARTICLES

This invention relates to a process for the manufacture of a porous or non-porous body of conglomerated particles.

Porous conglomerate bodies are used in a wide range of fields. For example, one kind can be used for the storage of hydrogen, and this body comprises hydrogen-absorbing particles, e.g. of $LaNi_5$ or FeTi, anchored in a porous structure. Another kind can be used for the storage of electricity, and this has the active mass, e.g. nickel hydroxide, of a collecting electrode embedded in a porous body. A third variety provides catalysts, for example for fuel cells in which Raney metal particles are incorporated in a porous structure. An example of a non-porous conglomerated body is a grinding or polishing element in which particles of hard material, e.g. diamond or carbides, are incorporated in a matrix. Self-lubricating bearing elements may be formed from a material which comprises a matrix incorporating solid lubricant particles, e.g. of tungsten disulphide, molybdenum disulphide, zinc disulphide and the like. Also, the incorporation of radio-active radiating materials, e.g. of cobalt, into a porous or non-porous matrix may be of considerable significance for medicinal or hygienic purposes. Thus, for example, germicidal air or liquid filters can be formed from porous bodies incorporating radio-active particles.

In all these examples it is necessary to achieve as firm as possible a connection between the particles and the matrix. Primarily that is to prevent the particles escaping the matrix under the influence of mechanical forces. However, in those cases in which the particles consist of a reactive material, the object also is to make access not too difficult for the medium which is to react on the particles, and this can be achieved by making the diffusion paths to the particles inside the matrix as short as possible.

German Pat. No. 1,458,487 describes a process for the production of self-lubricating materials in which dry lubricant particles are encased in a coherent, firmly adhering metal capsule. This is done by the direct separation of metal atoms on the particle surfaces by means of the thermal decomposition of a metal compound. The particles, possibly with the addition of organic and/or inorganic fillers, are conglomerated into a compact material. In this known material the dry lubricant particles are firmly anchored mechanically so that escape of individual particles as a result of friction is largely avoided. The solidity of this material can be increased by incorporating polycrystalline metal whiskers, such as are described in German Pat. No. 1,783,124. Such polycrystalline metal whiskers have a diameter of some 0.05 to about 10 $\mu$m and are composed of extremely fine crystallites which have a grain size of 80 A for example. As a result of this extraordinarily fine-grained make-up in association with a plurality of transpositions in the crystal lattice, mechanical strengths are obtained which for iron reach an order of magnitude of 800 kp/mm². A process for the production of polycrystalline metal whiskers is described in German Pat. No. 1,224,934, and reference may also be had to the treatise by H. J. Schladitz in "Zeitschrift fur Metallkunde", Vol. 59 (1968) No. 1, p. 18 to 22, which gives information on some properties of polycrystalline metal whiskers.

Although self-lubricating materials having high resistance are produced by these methods, and the stationary lubricant particles are firmly anchored, when extreme loadings are expected an even better anchoring of the lubricant particles is desirable. Also, the application of this known method to other fields does not necessarily lead to the same success, for different types of particle are not always suitable.

It is an object of this invention to provide a process for producing a body of conglomerated particles by means of which extremely firm anchoring of the particles in the matrix is achieved.

According to the present invention there is provided a method of manufacturing a body of conglomerated particles, comprising coating the particles with a network of polycrystalline metal whiskers with a diameter in the range 0.05 to 1 $\mu$m, heating the coated particles to a temperature at which the whiskers sinter together at their areas of contact, mixing the coated particles with filaments, and metallically bonding the filaments and the coated particles at their areas of contact.

Preferably, the whiskers have a diameter in the range 0.05 and 0.5 $\mu$m, with an optimum average diameter of 0.3 $\mu$m. The filaments and the coated particles can be joined together at their areas of contact by sintering, by the deposition of metal by means of thermal decomposition of a metal compound, or by electroless metal deposition, as will be described in more detail below.

By this method the particles are anchored very firmly in the matrix of whiskers and filaments although actual adherence between the particles and the metal whiskers is of secondary importance. Each particle, or a small agglomeration of particles, is coated with a highly resistant network of polycrystalline metal whiskers which, on sintering, not only join firmly together, but also contract and therefore even more closely encase the particles. This network also holds the particles securely when, as a result of mechanical or chemical forces, they partly dissociate. This may occur with hydrogen storage by means of FeTi powder or $LaNi_5$ powder.

The particles may consist of any of a most diverse range of materials, depending upon the field of application. They will generally have a grain size of 1 to 1000 $\mu$m, but in some cases less than 1 $\mu$m is possible. The polycrystalline metal whiskers consist preferably of Fe, Ni, Mo, W or Cr, or alloys of these metals. For particularly stringent demands it is possible to use dispersion hardened Fe whiskers.

The matrix in which the coated particles are incorporated may be formed from inorganic filaments of coal, glass, quartz, or $Al_2O_3$, or mineral wool (of asbestos for example). Alternatively, organic filaments may be used, for example of polyacrylnitrile, polyamide or polyimide. Preferably all these filaments have a diameter of between 1 and 20 $\mu$m.

The binding of such non-metallic filaments together and with the coated particles is effected by electroless metal deposition or by means of the deposition of metal by the thermal decomposition of a metal compound, preferably a metal carbonyl. This gives the filaments a metal coating, and effectively imparts to them good electric and thermal conductivity.

Alternatively, the matrix may be formed of polycrystalline metal whiskers, of the same metals or alloys as mentioned above. The joining of the whiskers together and with the coated particles can then be carried out by sintering, although metal deposition could again be used. The thickness of such matrix whiskers is preferably rather greater than that of the particle coating whiskers and it may be up to 20 μm.

Before they are coated with their network of polycrystalline metal whiskers the particles may be pre-coated with a thin metal layer. This again can be done by the deposition of metal by means of the thermal decomposition of a metal compound. The thickness of the pre-coat layer is preferably between 0.1 and 5 μm.

For joining the filaments together and to the coated particles by the thermal decomposition of a metal compound technique, use is made preferably of Fe, Ni, Mo, Cu, W, Cr. For fuel cell electrodes Ag could be employed and for some medical applications Au. The thickness of the deposited layer should preferably be between 0.1 and 5 1 μm if some porosity is desired. Otherwise it may be above this, for example in the range 10 to 20 μm. Also, various different metals can be deposited simultaneously or in succession.

This method initially produces a porous conglomerate body which can have a pore volume of up to 95%. It is usable in this form for various applications for which porosity is required, inter alia for hydrogen storage, for collecting electrodes and fuel cells, for catalysts, and for filters. However, when the need for porosity is less than the requirement for high mechanical strength, in a further step of the process the originally porous body can be compressed to the desired density by hot or cold pressing. Alternatively, it may be impregnated with metals or synthetic resins, for example epoxy resin or polyimide resin. This technique is suited for the production of grinding discs incorporating diamond or carbide particles, or of self-lubricating bearing materials incorporating solid lubricant particles. In another particularly preferred technique for the manufacture of grinding tools, the diamond or hard material particles coated with whiskers are sintered or metallised with the filaments onto a substrate.

The temperature at which the metal whiskers coating the particles are sintered together at their areas of contact is preferably in the range 400° to 600° C. If the following stage of the process involves the metallic joining of the coated particles with thick whiskers by further sintering, that is carried out in the preferred range 600° to 1100° C.

EXAMPLE 500 g Fe-Ti powder with an average grain size of 5 μm is mixed intensively in a ball mill in an inert atmosphere with 500 g polycrystalline iron whiskers having an average length of 5 to 10 μm. As a result of mass attraction, the extremely fine whiskers apply themselves around the individual powder particles. The mixture obtained is then divided by vibration, e.g. ultrasonic vibration, or by passing through a micro-sieve. Agglomerations of powder particles are formed, of which the great majority are individually coated with whiskers. The divided mixture is then introduced into a sintering furnace, for example by means of an endless conveyor belt. There it is heated to a temperature of 400° to 600° C. At this temperature the whiskers sinter together at their areas of contact, and at the same time they contract in such a manner that they even more closely and compactly surround the powder particles. The result is largely formations consisting of a plurality of whisker-coated powder particles, firmly joined together. These formations are now mixed with thicker polycrystalline iron whiskers having an average diameter of some 10 μm and a length of several millimeters. This mixture if compressed to the desired pore volume, and heated to a temperature of 600° to 1100° C. The thicker whiskers and the formations consisting of whisker coated particles then sinter firmly together.

The result is a very strong porous electrically-conductive body with firmly embedded Fe-Ti particles which is suitable for the storage of hydrogen.

I claim:

1. A method of manufacturing a body of conglomerated particles, comprising coating the particles with a network of polycrystalline metal whiskers with a diameter in the range 0.05 to 1 μm, heating the coated particles to a temperature at which the whiskers sinter together at their areas of contact, mixing the coated particles with filaments, and metallically bonding the filaments and the coated particles at their areas of contact.

2. A method as claimed in claim 1, wherein the diameter of the whiskers is in the range 0.05 to 0.5 μm.

3. A method as claimed in claim 2, wherein the diameter of the whiskers is an average of 0.3 μm.

4. A method as claimed in claim 1, wherein the metallic connection of the filaments and the coated particles is effected by the deposition of metal by means of thermal decomposition of a metal compound.

5. A method as claimed in claim 4, wherein the metal compound is selected from the thermally decomposable compounds of the metals Fe, Ni, Mo, W, Cr, Cu, Ag and/or Au.

6. A method as claimed in claim 1, wherein the metallic connection of the filaments and the coated particles is effected by electroless metal deposition.

7. A method as claimed in claim 1, wherein the filaments have a diameter of up to 20 μm.

8. A method as claimed in claim 7, wherein the filaments are polycrystalline metal whiskers, and the mixed filaments and coated particles are heated to between 600° and 1100° C to bond them together.

9. A method as claimed in claim 8, wherein the filament whiskers are made from the metals Fe, Ni, Mo, W, Cr, alloys of these metals, or are dispersion hardened Fe whiskers.

10. A method as claimed in claim 1, wherein the whiskers are made from the metals Fe, Ni, Mo, W, Cr, alloys of these metals, or are dispersion hardened Fe whiskers.

11. A method as claimed in claim 1, wherein the conglomerated body is compressed.

12. A method as claimed in claim 1, wherein the filaments and coated particles are also joined to a substrate at the same time as they are bonded together.

13. A method as claimed in claim 1, wherein the initially porous body is impregnated with a metal.

14. A method as claimed in claim 1, wherein the initially porous body is impregnated with a synthetic resin.

15. A method as claimed in claim 1, wherein the particles, before they are coated with metal whiskers, are pre-coated by deposition of metal by the thermal decomposition of a metal compound.

* * * * *